Figure 1:
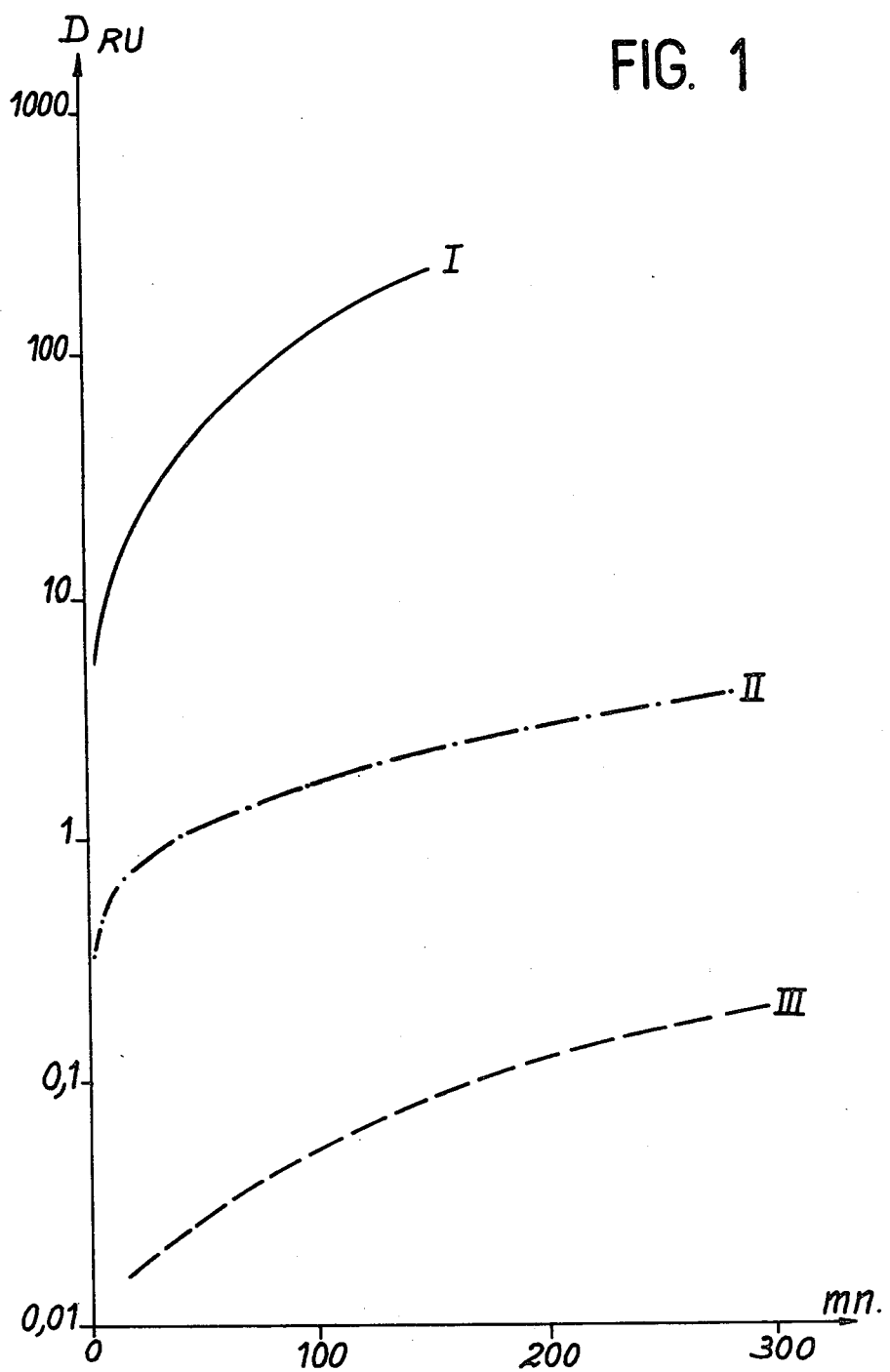

United States Patent [19]

Fitoussi et al.

[11] 4,282,112

[45] Aug. 4, 1981

[54] RUTHENIUM RECOVERY PROCESS BY SOLVENT EXTRACTION

[75] Inventors: Richard Fitoussi, Versailles; Sylvie Lours, Fontenay-aux-roses; Claude Musikas, Villebon, all of France

[73] Assignee: Commissariat a l'Energie Atomique, Paris, France

[21] Appl. No.: 116,588

[22] Filed: Jan. 29, 1980

[30] Foreign Application Priority Data

Feb. 8, 1979 [FR] France .................................. 79 03241

[51] Int. Cl.$^3$ .............................................. C01G 55/00
[52] U.S. Cl. ............................. 252/301.1 W; 423/10;
423/22; 423/DIG. 14; 75/101 BE
[58] Field of Search ................... 423/10, 22, DIG. 14;
75/101 BE; 252/301.1 W

[56] References Cited

U.S. PATENT DOCUMENTS

| | | | |
|---|---|---|---|
| 2,796,424 | 6/1957 | Schulz et al. | 423/22 |
| 2,894,816 | 7/1959 | Hyman et al. | 423/22 |
| 2,967,209 | 1/1961 | Grummitt et al. | 423/22 |
| 2,982,601 | 5/1961 | Wilson | 423/10 |
| 3,208,819 | 9/1965 | Wallace | 423/10 |
| 3,326,811 | 6/1967 | Healy | 423/10 |
| 4,012,481 | 3/1977 | Baltz et al. | 75/101 BE |
| 4,105,442 | 8/1978 | Fieberg et al. | 75/101 BE |
| 4,107,261 | 8/1978 | Baltz et al. | 423/22 |

FOREIGN PATENT DOCUMENTS 1404016   5/1965   France ....................................... 423/10

OTHER PUBLICATIONS

Krask, "Nuclear Science Absts.", vol. 14, #1B, Jul. 15, 1960, p. 1599.
Brown et al., "Journal Applied Chem.", vol. 10, Oct. 1960, pp. 422–428.
Borshch et al., "Chemical Abstracts", vol. 89, 1978, #153439n.

*Primary Examiner*—Herbert T. Carter
*Attorney, Agent, or Firm*—Pearne, Gordon, Sessions, McCoy & Granger

[57] ABSTRACT

Process for the recovery of the ruthenium present in an aqueous nitric solution, wherein the ruthenium is extracted in an organic solvent by contacting the nitric solution with an organic phase comprising an organophosphorous compound having at least one electron donor sulphur atom in the presence of a compound able to displace NO+ ions of the ruthenium complexes present in the nitric solution. Application to the recovery of ruthenium contained in a nitric solution obtained by dissolving irradiated fuel elements.

9 Claims, 6 Drawing Figures

RUTHENIUM RECOVERY PROCESS BY SOLVENT EXTRACTION

BACKGROUND OF THE INVENTION

The invention relates to a process for the recovery of ruthenium present in an aqueous nitric solution and relates to a process for recovering the radioactive ruthenium present in a nitric solution obtained by dissolving irradiated nuclear fuel elements.

Conventional processes for the reprocessing of irradiated nuclear fuel elements generally involve a first stage of dissolving the nuclear fuel by means of nitric acid, which leads to the obtainment of a nitric solution containing not only uranium and plutonium but also certain fission products, particularly ruthenium contained in by no means negligible quantities in irradiated fuels. Thus, one ton of irradiated uranium in a light water nuclear reactor contains approximately 2300 g of ruthenium.

Thus, considerable interest in attached to the recovery of ruthenium not only in order to ensure a satisfactory purification of the uranium and plutonium, but also due to the catalytic and photochemical metallurgical properties of ruthenium, which make it an element sought in numerous applications. However, in irradiated fuel processing processes the recovery of ruthenium causes certain problems, because during the first uranium and plutonium extraction cycle in an organic solvent, such as tributyl phosphate, the ruthenium fraction which is also extracted in this solvent is only re-extractable with difficulty and the solvents used consequently have a high residual activity.

It is also desirable to quantitatively recover the ruthenium before subjecting the nitric dissolving solution to a first uranium and plutonium extraction cycle.

The presently known processes for recovering ruthenium from nitric solutions comprise transforming the ruthenium complexes present in these solutions into volatile ruthenium tetraoxide $RuO_4$. This ruthenium volatilization is generally carried out by means of ozone or other oxidizing agents such as anions, e.g. permanganates, dichromates, periodates, chromates, metal cations such as silver, sodium (IV), cobalt or lead dioxide.

The process for the recovery of the ruthenium present in a nitric solution is also known which consists of adding nitride ions to the solution and passing ozones through this solution in order to form and volatilize the ruthenium tetroxide.

However, these processes have certain disadvantages.

Thus, it is necessary to heat the solution to a temperature of about 95° C. Moreover, said processes require the adding of catalysts to the nitric solution and only permit a quantitative recovery of ruthenium by being carried out over a relatively long period lasting approximately 12 hours.

A process for the extraction of ruthenium from aqueous solutions by means of organic solvents in the presence of nitride ions is also known.

It has also been envisaged to extract ruthenium from hydrochloric solutions by means of thiophosphoric acids.

However, these processes do not permit a quantitative recovery of the ruthenium from nitric solutions.

BRIEF SUMMARY OF THE INVENTION

The present invention relates to a process for the recovery of ruthenium which obviates the above disadvantages.

The process according to the invention for the recovery of ruthenium present in an aqueous nitric solution is characterized in that the ruthenium is extracted in an organic solvent by bringing the said nitric solution into contact with an organic phase comprising an organophosphorous compound having at least one electron donor sulphur atom in the presence of a compound able to displace the $NO^+$ ions of the ruthenium complexes present in the nitric solution.

According to the invention, the organophosphorous compound is advantageously a dialkyl-dithiophosphoric acid such as di-(2-ethyl-hexyl)-dithiophosphoric acid.

The above process has the advantage of leading to a quantitative recovery of the ruthenium present in a nitric solution obtained for example by dissolving irradiated nuclear fuel elements. Thus, in this case, the uranium VI and the plutonium are not in practice extracted in the organic solvent, so that it is possible to recover the ruthenium with satisfactory yields.

According to the invention, the compound which is able to displace the $NO^+$ ions of the ruthenium complexes present in the nitric solution is advantageously sulphamic acid or hydrazine.

When sulphamic acid is used, the latter is preferably added to the aqueous phase in a quantity such that the sulphamic acid concentration of the aqueous phase is between 0.05 and 1 m/l.

Advantageously, extraction takes place at a temperature between 20° and 80° C., preferably at 70° C.

When the ruthenium is extracted by means of di-(2-ethyl-hexyl)-dithiophosphoric acid in the presence of sulphamic acid a ruthenium complex is formed in the organic phase which in ultraviolet spectrometry has three absorption bands at 515, 415 and 360 nanometers doubtless corresponding to the extraction of a complex according to the following formula:

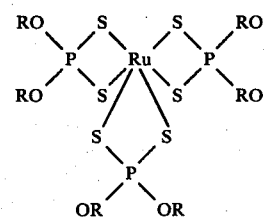

in which R represents the 2-ethyl-hexyl radical.

It is considered that the extraction mechanism corresponds to the following reaction diagram:

$3 [Ru NO(NO_3)_x(H_2O)_{5-x}]^{(3-x)+} + 2NH_2SO_3H +$

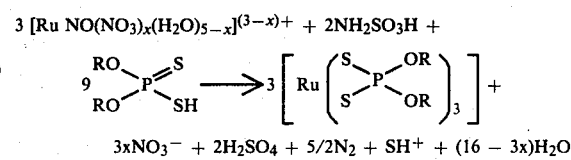

$3xNO_3^- + 2H_2SO_4 + 5/2N_2 + SH^+ + (16 - 3x)H_2O$

According to a variant of the process of the invention the ruthenium extraction is carried out by means of an organic phase comprising an organophosphorous compound containing at least one electron donor sulphur atom and one quaternary ammonium salt, such as tricapryl-methyl-ammonium chloride.

According to this variant of the process of the invention, the ruthenium extraction coefficient is improved, doubtless due to the fact that the ruthenium present in nitric solution can exist with different valencies and because the presence of the quaternary ammonium salt thus makes it possible to carry out the extraction of anionic complexes corresponding to ruthenium valence 2.

In this variant of the process of the invention the extraction is also performed in the presence of a compound able to displace the $NO^+$ ions of the ruthenium complexes, advantageously at a temperature between 20° and 80° C., preferably at 70° C.

In this case, the ruthenium complex extracted in the organic phase also has in ultraviolet spectrometry three absorption bands at 550, 465 and 370 nanometers. It is assumed that in this case the extraction mechanism corresponds to the following reaction diagram:

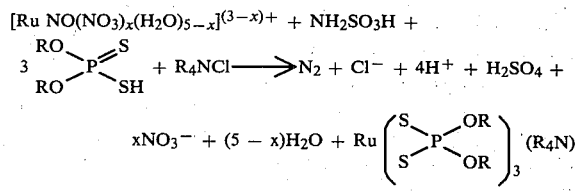

For performing the process of the invention, the organic solvent advantageously comprises an inert diluent, such as dodecane.

It is pointed out that the process according to the invention can be performed in any conventional extraction apparatus and in particular in mixer-settlers, pulsed columns, centrifugal extractors, etc.

DESCRIPTIONS OF DRAWINGS AND EXAMPLES

Figure 2:
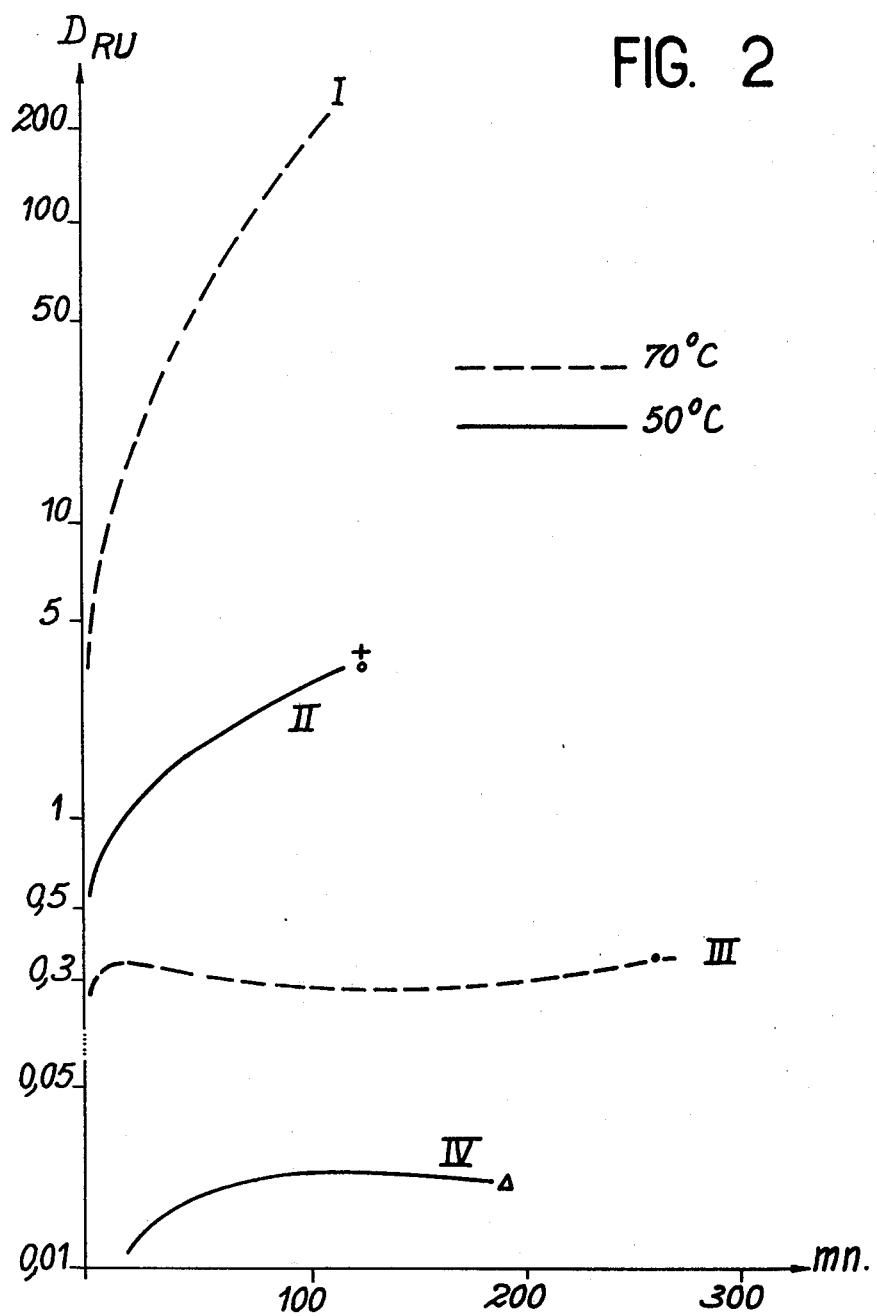
Figure 3:
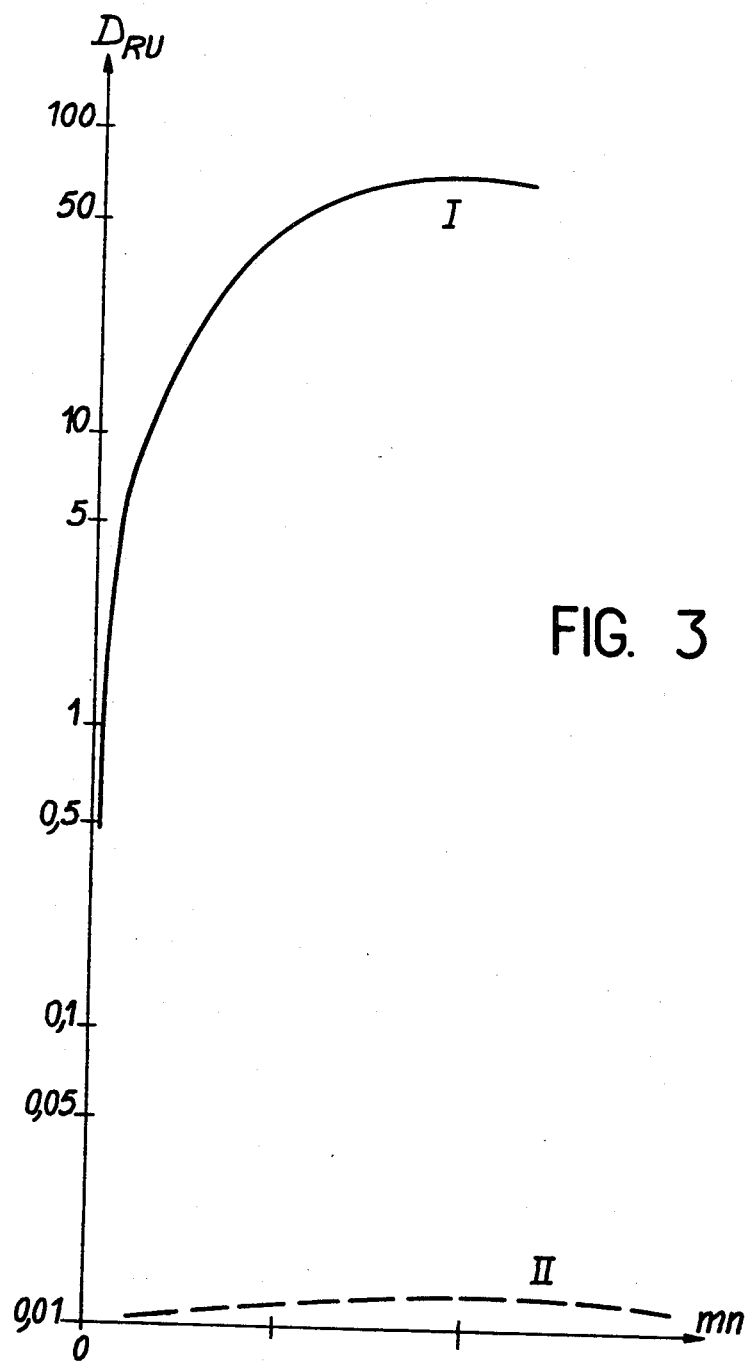

The invention is described in greater detail hereinafter relative to non-limitative examples and with reference to the attached drawings, wherein show:

FIGS. 1, 2 and 3 graphs representing the variations in the distribution or partition coefficient D of the ruthenium as a function of the time in minutes in the case of an extraction performed by means of an organic solvent constituted by di-(2-ethyl-hexyl)-dithiophosphoric acid diluted in dodecane, FIGS. 1, 2 and 3 illustrating respectively the effect of the temperature, the addition of sulphamic acid and the addition of hydrazine on the partition coefficient D.

Figure 4:
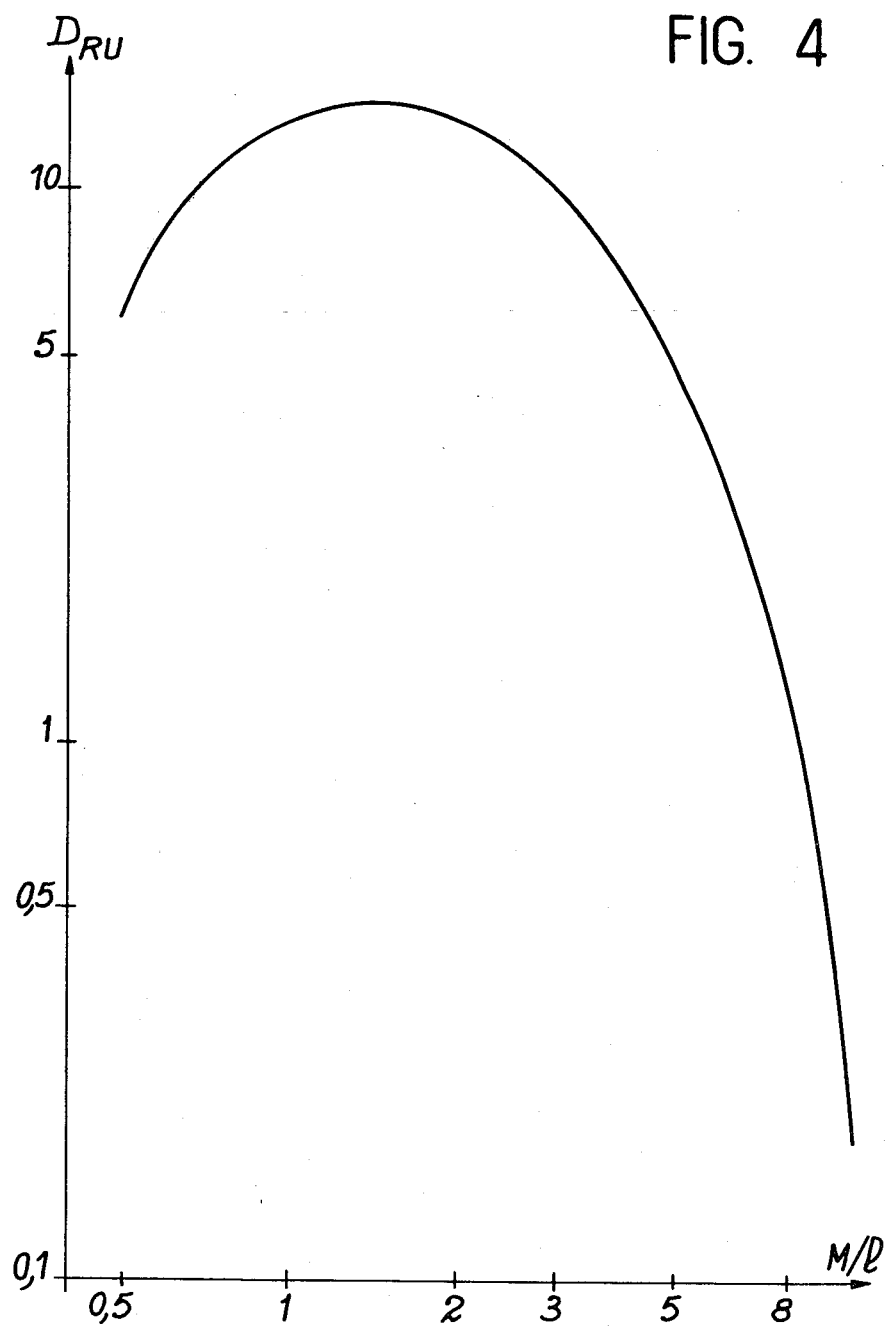

FIG. 4 a graph showing variations of the partition coefficient D of ruthenium as a function of the nitric acid concentration of the starting solution during an extraction process performed by means of di-(2-ethyl-hexyl)-dithiophosphoric acid.

Figure 5:
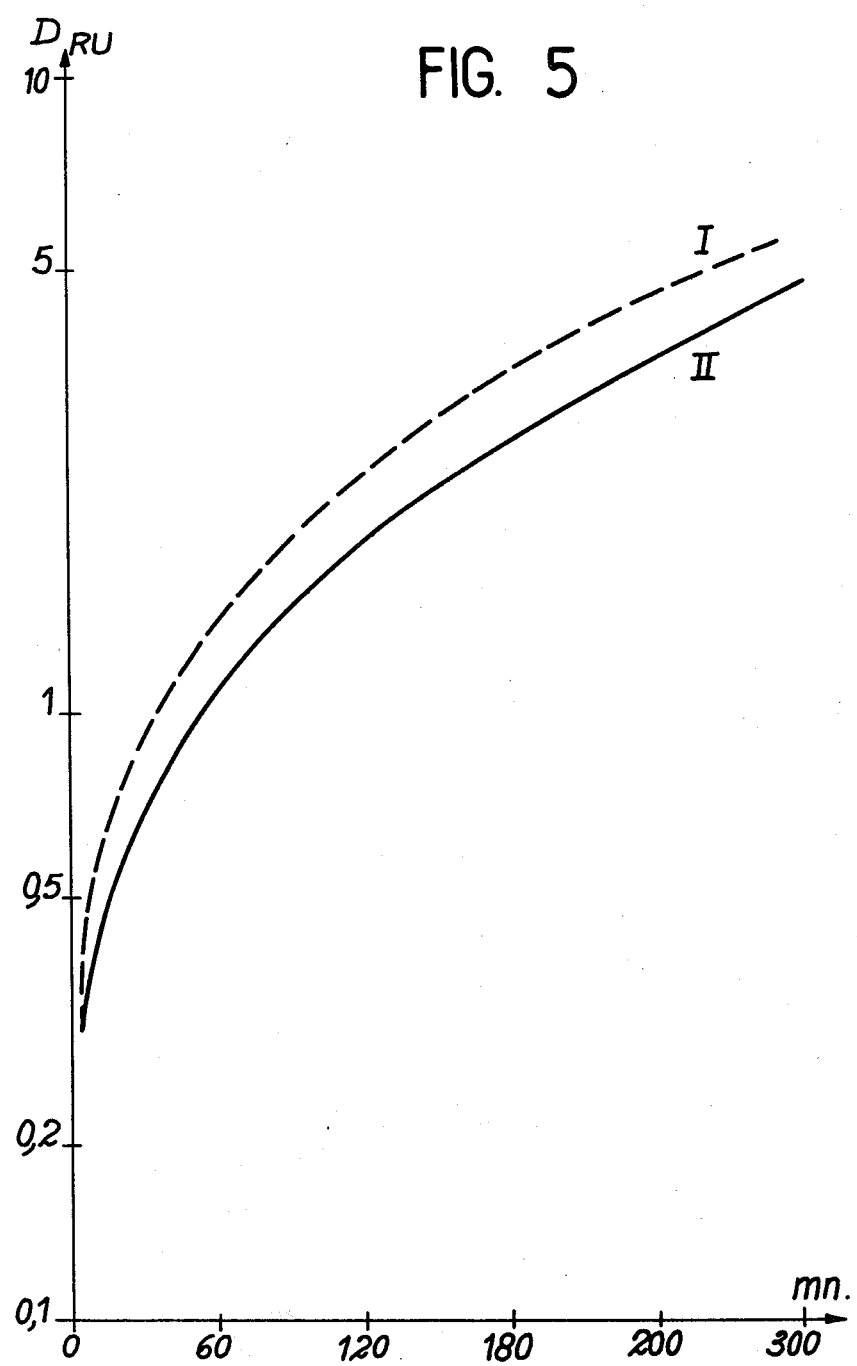

FIG. 5 a diagram showing variations in the partition coefficient D of ruthenium as a function of time and illustrating the effect of the presence of uranyl nitrate in the starting solution.

Figure 6:
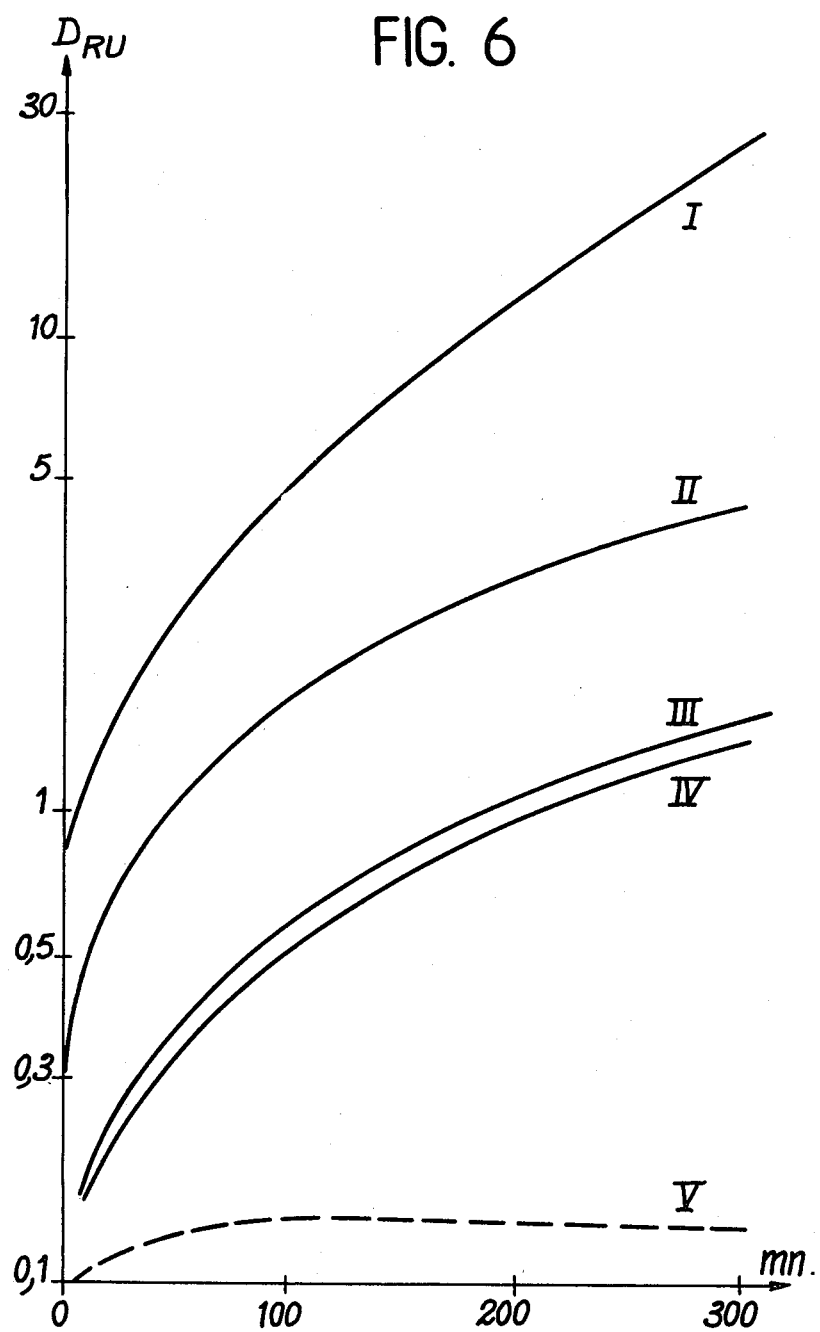

FIG. 6 a diagram showing variations in the partition coefficient D of the ruthenium as a function of time in the case of an extraction process performed by means of an organic solvent containing di-(2-ethyl-hexyl)-dithiophosphoric acid and tricapryl-methyl-ammonium chloride.

EXAMPLE 1

This example relates to the recovery of ruthenium from a 3 N nitric acid solution containing $2.6 \cdot 10^{-3}$ M/liter of radioactive ruthenium in the form of mixed nitrato and nitrosoruthenium complexes at valencies II, III and IV.

In this example, an organic solvent constituted by di-(2-ethyl-hexyl)-dithiophosphoric acid (DEHDTP) diluted in dodecane is used for extracting the ruthenium, the DEHDTP concentration of the organic phase being 0.5 M/liter.

Extraction is carried out in an apparatus which is thermostatically controlled by water circulation by bringing into contact within the apparatus 20 cm³ of aqueous phase and 20 cm³ of organic phase and by stirring the two phases in the presence of at least one rotary bar magnet.

During extraction, the phases present are sampled accompanied by stirring and after separating them by centrifuging each of them is analysed by gamma spectrometry in order to determine their respective ruthenium concentrations, which makes it possible to calculate the distribution or partition coefficient D of the ruthenium which is equal to the ratio of the ruthenium concentration of the organic phase to the ruthenium concentration of the aqueous phase.

In a first series of experiments, this extraction is carried out by using a solvent after adding to the aqueous phase 0.25 M/l of sulphamic acid and extraction is performed at temperatures of 20° C., 50° C. and 70° C., whilst determining the ruthenium partition coefficient as a function of time for each temperature.

The results obtained are firstly given in FIG. 1, which shows the variations in the partition coefficient D of ruthenium as a function of time in minutes for extractions carried out respectively at temperatures of 70° C. (curve I), 50° C. (curve II) and 20° C. (curve III).

It can be seen that the partition coefficient increases with temperature, the best results being obtained when extraction is performed at 70° C.

In a second series of experiments, ruthenium extraction is carried out either at 70° C. or at 50° C. from aqueous phases having different sulphamic acid concentrations, whilst once again determining in each case the partition coefficient D of the ruthenium as a function of time.

The results obtained are given in FIG. 2, which illustrates the variations in the partition coefficient D as a function of time for extraction processes carried out at 70° C. with sulphamic acid concentrations of 0.5 M/l (curve I) and 0.01 M/l (curve III) and for extraction processes carried out at 50° C. with sulphamic acid concentrations of 0.4 M/l (curve II) and in the absence of sulphamic acid (curve IV).

It can be seen that the partition coefficient D is low in the absence of sulphamic acid (curve IV) and that the addition of sulphamic acid makes it possible to improve this partition coefficient.

Moreover, it has been found that on the basis of a sulphamic acid concentration of 0.4 M/l, the ruthenium extraction kinetics substantially do not change.

In a third series of experiments, ruthenium extraction is carried out by adding hydrazine to the aqueous phase, extraction being performed at 70° C.

The results obtained are given in FIG. 3, which shows the variations in the partition coefficient D of ruthenium as a function of time for extractions carried out on the basis of aqueous phases having respectively hydrazine concentrations of 0.1 M/l (curve I) and 0.01 M/l (curve II).

It can be seen that hydrazine also leads to an improvement in the partition coefficient D, but that it is less effective than sulphamic acid.

EXAMPLE 2

This example relates to ruthenium recovery from a nitric solution with a ruthenium concentration of $2.6 \cdot 10^{-3}$ M/liter and a sulphamic acid concentration of 0.5 M/liter.

In this example, extraction is carried out at a temperature of 50° C. by contacting 20 cm$^3$ of nitric solution and 20 cm$^3$ of organic solvent constituted by di-(2-ethyl-hexyl)-dithiophosphoric acid diluted in dodecane, the DEHDTP concentration of the organic phase being 0.5 M. After extracting for 6 hours accompanied by stirring, the two phases are separated by centrifuging and the partition coefficient D of the ruthenium is determined as in example 1.

The results obtained on varying the nitric acid concentration of the starting solution are given in FIG. 4, which shows the variations in the partition coefficient D of the ruthenium as a function of the nitric acid concentration of the aqueous phase.

These results show that the partition coefficient D varies little when the nitric acid concentration is between 0.3 and 3 N, but decreases very rapidly when the nitric acid concentration exceeds 5 N.

EXAMPLE 3

In this example, ruthenium is covered from a 3 N solution containing $2.6 \cdot 10^{-3}$ M/liter of ruthenium, 0.5 M/l of uranyl nitrate and 0.25 M/l of sulphamic acid.

Extraction is performed at 50° C. using the same organic solvent as in Example 1. The partition coefficient D of the ruthenium is also determined as a function of time as in Example 1.

The results obtained are given in FIG. 5 in which curve I represents the variations in the partition coefficient D of the ruthenium as a function of time, when the aqueous phase contains uranyl nitrate, curve II corresponding to the same experiment performed in the absence of uranyl nitrate.

It can be seen that the partition coefficients D are comparable and that uranium has no effect on the extraction kinetics. Moreover, it should be noted that the uranium is not extracted in the organic solvent, the partition coefficient D of the uranium being $3 \cdot 10^{-2}$ after 300 minutes of extraction.

EXAMPLE 4

This example relates to the recovery of ruthenium from a 3 N nitric solution containing $2.6 \cdot 10^{-3}$ M/l of ruthenium.

In this example, the organic solvent is constituted by a mixture of di-(2-ethyl-hexyl)-dithiophosphoric acid (DEHDTP) and tricapryl-methyl-ammonium chloride diluted in dodecane, the DEHDTP concentration of the organic phase being 0.5 M and the tricapryl-methyl-ammonium chloride concentration of the organic phase being 0.1 M.

In this example, extraction is carried out at a temperature of 20° or 50° C., after adding or not adding sulphamic acid and optionally uranyl nitrate to the aqueous phase. In each case, the partition coefficient D of the ruthenium is determined as a function of time as in Example 1.

The results obtained are given in FIG. 6, which represents the variations of the partition coefficient D of the ruthenium as a function of time, for extraction processes performed under the following conditions:

Curve I; Aqueous phase containing 0.25 M/l of sulphamic acid, extraction is performed at 50° C.

Curve II (for information): Aqueous phase containing 0.25 M/l of sulphamic acid, but extraction performed by means of DEHDTP only at 50° C.

Curve III: Aqueous phase containing 0.25 M/l of sulphamic acid, extraction performed at 20° C.

Curve IV: Aqeuous phase containing 0.25 M/l of sulphamic acid and 0.5 M/l of uranyl nitrate, extraction performed at 50° C.

Curve V: Aqueous phase not containing sulphamic acid, extraction performed at 50° C.

The addition of a single quaternary ammonium salt, such as tricapryl-methyl-ammonium chloride to the DEHDTP makes it possible to improve the ruthenium partition coefficient, except when the aqueous phase also contains uranium, so that it can be assumed that the quaternary ammonium salt reacts with the uranyl nitrate and no longer fulfills its extractant function with respect to ruthenium II.

The effect of temperature is the same as when using an organic solvent only containing DEHDTP diluted in dodecane, the partition coefficient D also increasing with the temperature.

The addition of sulphamic acid to the aqueous phase makes it possible to improve the partition coefficient.

What is claimed is:

1. A process for the recovery of the ruthenium present in an aqueous nitric solution, wherein the ruthenium is extracted in an organic solvent by contacting the nitric solution with an organic phase comprising a dialkyldithiophosphoric acid in the presence of a compound able to displace NO$^+$ ions of the ruthenium complexes present in the nitric solution, and separating said organic phase containing the extracted ruthenium from said nitric solution.

2. A process according to claim 1, wherein the dialkyldithiophosphoric acid is di-(2-ethyl-hexyl)-dithiophosphoric acid.

3. A process according to claim 1, wherein the compound is sulphamic acid.

4. A process according to claim 3, wherein the sulphamic acid concentration of the aqueous phase is between 0.05 and 1 M/l.

5. A process according to claim 1, wherein the compound is hydrazine.

6. A process according to claim 1, wherein extraction is carried out at a temperature between 20° and 80° C.

7. A process according to claim 1, wherein the organic phase also contains a quaternary ammonium salt.

8. A process according to claim 7, wherein the quaternary ammonium salt is tricapryl-methyl-ammonium chloride.

9. Application of the process according to claim 1, to the recovery of the ruthenium contained in a nitric solution obtained by dissolving irradiated fuel elements.

* * * * *